UNITED STATES PATENT OFFICE.

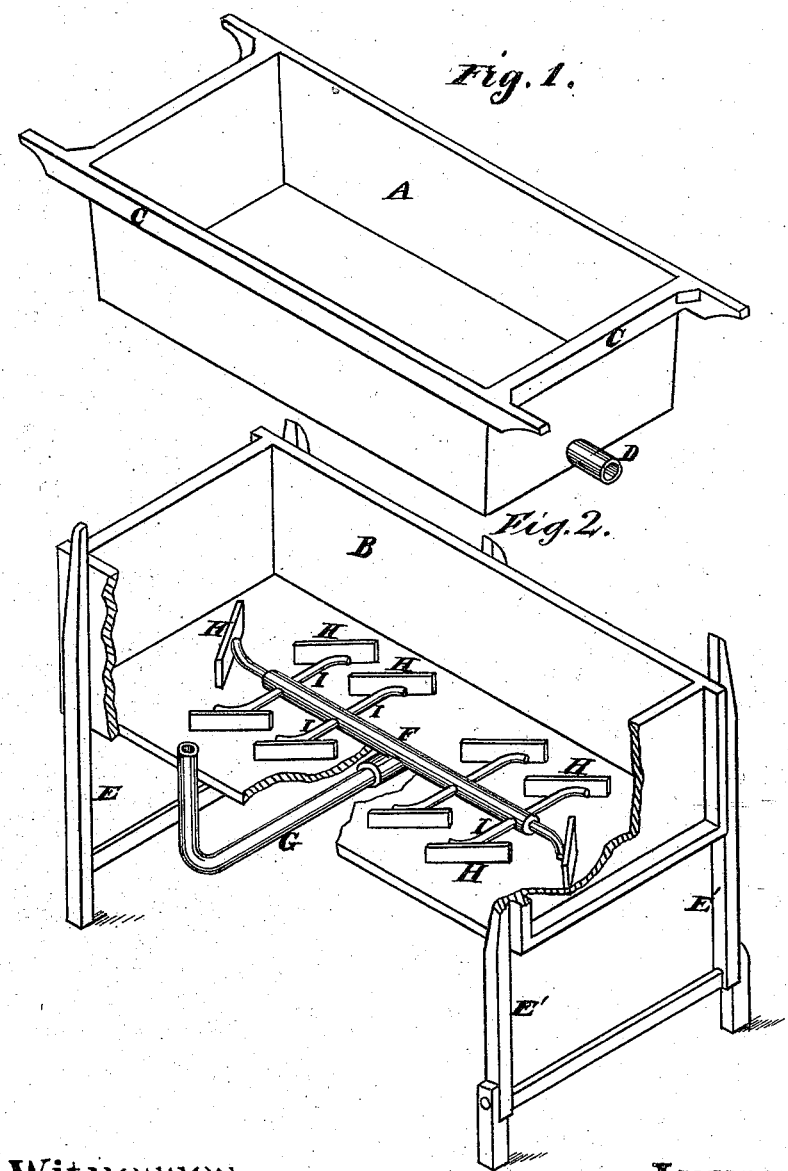

JOHN S. WOOLSEY, OF GILROY, CALIFORNIA.

IMPROVEMENT IN CHEESE-VAT STEAM-HEATERS.

Specification forming part of Letters Patent No. 156,519, dated November 3, 1874; application filed June 12, 1874.

*To all whom it may concern:*

Be it known that I, JOHN S. WOOLSEY, of Gilroy, Santa Clara county, State of California, have invented an Improved Steam-Distributer for Cheese-Vats; and I do hereby declare the following description and accompanying drawings are sufficient to enable any person skilled in the art or science to which it most nearly appertains to make and use my said invention or improvement without further invention or experiment.

My invention relates to improvements in the distribution of heat where it is desirable to have a very even temperature, and it is more especially adapted to be used in vats for the manufacture of cheese which are heated by steam.

My invention consists in the employment of a series of curved distributing-pipes, in combination with deflecting-plates, whereby the steam which is received centrally in the box which contains the plates is evenly distributed beneath and around the vat, which is set in the steam-box.

Referring to the accompanying drawings for a more complete explanation of my invention, Figure 1 is a perspective view of the vat and the heater.

A is a vat, such as may be employed for curdling the milk for cheese-making. This vat is fitted to set into the steam-box B, having side and end rails C, which fit closely upon the top of the box, and a discharge-pipe, D, which passes out through the bottom of one end of the steam-box. This steam-box B is mounted upon suitable legs E E'. The legs E' are jointed, and by turning them back the vat can be tilted, so as to empty out the whey conveniently. The box has a pipe, F, extending longitudinally through its center. This pipe is supplied with steam from the boiler by means of the feed-pipe G, which opens into the pipe near its center, so that the steam passes from the center toward each end of the pipe F. Upon each side of the pipe F are branch pipes I I, which extend out at right angles, and may be curved slightly, as shown. Inclined deflectors H are placed at the ends of these pipes, and serve to carry the steam about the box in such a manner that the heat upon the vat above will be equalized, and all parts will be subjected to the same temperature.

Having thus described my invention, what I claim, and desire to secure by Letters Patent, is—

The longitudinal pipe F, with its branch pipes I, and the deflecting-plates H, substantially as and for the purpose herein described.

In witness whereof I hereunto set my hand and seal.

JOHN S. WOOLSEY. [L. S.]

Witnesses:
WILLIAM E. LINDSEY,
RICHARD B. BUCKNER.